(12) United States Patent
Ajay et al.

(10) Patent No.: US 11,849,716 B2
(45) Date of Patent: Dec. 26, 2023

(54) INSECT GUARD FOR AN ASPIRATED SMOKE, GAS, OR AIR QUALITY MONITORING SYSTEMS AND DEVICES

(71) Applicant: Honeywell International Inc., Charlotte, NC (US)

(72) Inventors: Kemal Ajay, Mount Waverley (AU); Deepakumar Subbian, Féchy (CH)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/583,735

(22) Filed: Jan. 25, 2022

(65) Prior Publication Data

US 2023/0225307 A1    Jul. 20, 2023

Related U.S. Application Data

(60) Provisional application No. 63/300,161, filed on Jan. 17, 2022.

(51) Int. Cl.
*A01M 29/34* (2011.01)
*G08B 17/10* (2006.01)

(52) U.S. Cl.
CPC ............. *A01M 29/34* (2013.01); *G08B 17/10* (2013.01)

(58) Field of Classification Search
CPC ............................... A01M 29/34; G08B 17/10
See application file for complete search history.

(56) References Cited

U.S. PATENT DOCUMENTS

| 5,209,286 | A | * | 5/1993 | Schmidt | ................. | F24F 5/005 |
| | | | | | | 165/45 |
| 2005/0241218 | A1 | * | 11/2005 | Frounfelker | ........... | A01G 13/04 |
| | | | | | | 47/31.1 |
| 2009/0002182 | A1 | | 1/2009 | Knox et al. | | |
| 2011/0068936 | A1 | * | 3/2011 | Shimada | ................ | G08B 17/10 |
| | | | | | | 73/204.22 |
| 2013/0201024 | A1 | * | 8/2013 | Greenwood | ......... | G08B 17/113 |
| | | | | | | 340/628 |
| 2014/0063498 | A1 | * | 3/2014 | Numao | ................ | G08B 17/107 |
| | | | | | | 356/338 |
| 2015/0146204 | A1 | * | 5/2015 | Shibuya | ............... | G08B 17/113 |
| | | | | | | 356/338 |
| 2018/0073982 | A1 | * | 3/2018 | Ebata | ..................... | G01N 21/61 |
| 2018/0180540 | A1 | * | 6/2018 | Iguchi | .................... | G08B 17/10 |

(Continued)

FOREIGN PATENT DOCUMENTS

| CN | 209525733 U | 10/2019 |
| CN | 217109779 U | 8/2022 |

(Continued)

*Primary Examiner* — Ojiako K Nwugo
(74) *Attorney, Agent, or Firm* — Brooks, Cameron & Huebsch, PLLC

(57) ABSTRACT

Devices, methods, and systems having insect guards in devices and systems for aspirated smoke, gas, or air quality monitoring are described herein. One aspirated smoke, gas, or air quality monitoring unit includes a detector module that includes at least one particulate sensing chamber within the detector module and an air inlet connecting the sampling tube to the particulate sensing chamber allowing communication of air from the sampling tube to the particulate sensing chamber; and a spiral shaped insect guard positioned within the inlet.

18 Claims, 5 Drawing Sheets

(56) References Cited

U.S. PATENT DOCUMENTS

| | | | | |
|---|---|---|---|---|
| 2019/0113494 A1* | 4/2019 | Desjardins | ............ | G01N 33/004 |
| 2019/0147717 A1* | 5/2019 | Shimazu | ................ | G08B 17/06 |
| | | | | 340/628 |
| 2021/0018420 A1* | 1/2021 | Washizu | ................ | G01N 21/53 |
| 2021/0405007 A1* | 12/2021 | Solomon | ................... | G01G 3/13 |
| 2022/0246010 A1* | 8/2022 | Gadonniex | .......... | G08B 17/113 |
| 2022/0319290 A1* | 10/2022 | Watanabe | ............... | G01N 21/53 |

FOREIGN PATENT DOCUMENTS

| | | |
|---|---|---|
| EP | 3866131 A1 | 8/2021 |
| JP | 5154528 B2 | 2/2013 |

\* cited by examiner

INSECT GUARD FOR AN ASPIRATED SMOKE, GAS, OR AIR QUALITY MONITORING SYSTEMS AND DEVICES

PRIORITY INFORMATION

This Application claims priority to U.S. Provisional Application No. 63/300,161, filed Jan. 17, 2022, the contents of which are incorporated herein by reference.

TECHNICAL FIELD

The present disclosure relates generally to insect guards for use in devices and systems for aspirated smoke, gas, or air quality monitoring.

BACKGROUND

Some smoke detection systems have a number of sample points spaced around a building that are connected via sampling tubes to a remotely located single central detector apparatus that samples air taken from the sample points to determine if smoke, harmful chemicals, or a fire is present in an area of the building. For example, such systems may be referred to as very early smoke detection apparatus (VESDA) systems.

In some jurisdictions, it is a requirement of fire standards that smoke detection systems be fitted with an insect guard in which a mesh is used to prevent entry of large insects which may trigger a false alarm if the insect reaches the smoke detection chamber. In such implementations, the insect guard aperture size is specified by the applicable fire standards.

Although used for this purpose, meshes readily accumulate dust, lint, and other particulate and, therefore, impede the entry of smoke and other harmful particles into the detection unit. This is especially true of meshes placed in the air flow path of aspirated smoke detection systems, which is almost always where they will be placed to keep insects out of the unit.

DETAILED DESCRIPTION

Devices, methods, and systems having insect guards in devices and systems for aspirated smoke, gas, or air quality monitoring are described herein. One aspirated smoke, gas, or air quality monitoring unit includes a detector module that includes at least one particulate sensing chamber within the detector module and an air inlet connecting the sampling tube to the particulate sensing chamber allowing communication of air from the sampling tube to the particulate sensing chamber; and a spiral shaped insect guard positioned within the inlet. Embodiments of the present disclosure use tubes to sample air, smoke, and/or gas from locations in a building that are remotely located from a central detector module (air quality monitoring unit).

An insect guard structure is proposed in the present disclosure that uses a wire element formed into a spiral form, by coiling it within a plane such that the wire coils around itself creating a larger coil in each revolution around a reference point at the center of the spiral. In the embodiments of the present disclosure, the gap between adjacent outside surfaces of two adjacent coils is no more than that permitted by an applicable government standard, such as UL Standard 268, $7^{th}$ edition. Section 7.2.

An alternate form is the wire element formed in a zig-zag pattern where the gap between adjacent layers is no more than the permitted standard.

The advantage of these structures is that the relative aperture area compared to the overall area is high, compared with mesh, allowing less impedance to air flow and, therefore, less accumulation of airborne dust.

The types of wire used to create the spiral can be of different cross sections and can offer different characteristics of air flow rate, turbulence generation, and/or dust accumulation, among other characteristics. For example, the wire can be a circular, ellipsoidal, or tear drop shape. Cross sectional shapes can also be polygons, such as triangles, rectangles, rhombuses, other parallelograms, trapeziums, trapezoids, and the like.

In one implementation, a rectangular cross section wire element version used in aspirated systems, can have its windward edge tapered, creating a trapezium shape in order to reduce the windward edge surface and to reduce aerodynamic resistance and turbulence further reducing the propensity to collect dust from the air flow. This design is desirable as creation of the shape is relatively easy from a manufacturing standpoint as the wire can be tapered before the coiling process to create the spiral is implemented. A similar functional effect can also be accomplished with ellipsoidal cross section and tear drop cross section wire elements as will be discussed in more detail below with respect to FIGS. 5A-5E.

Figure 1:
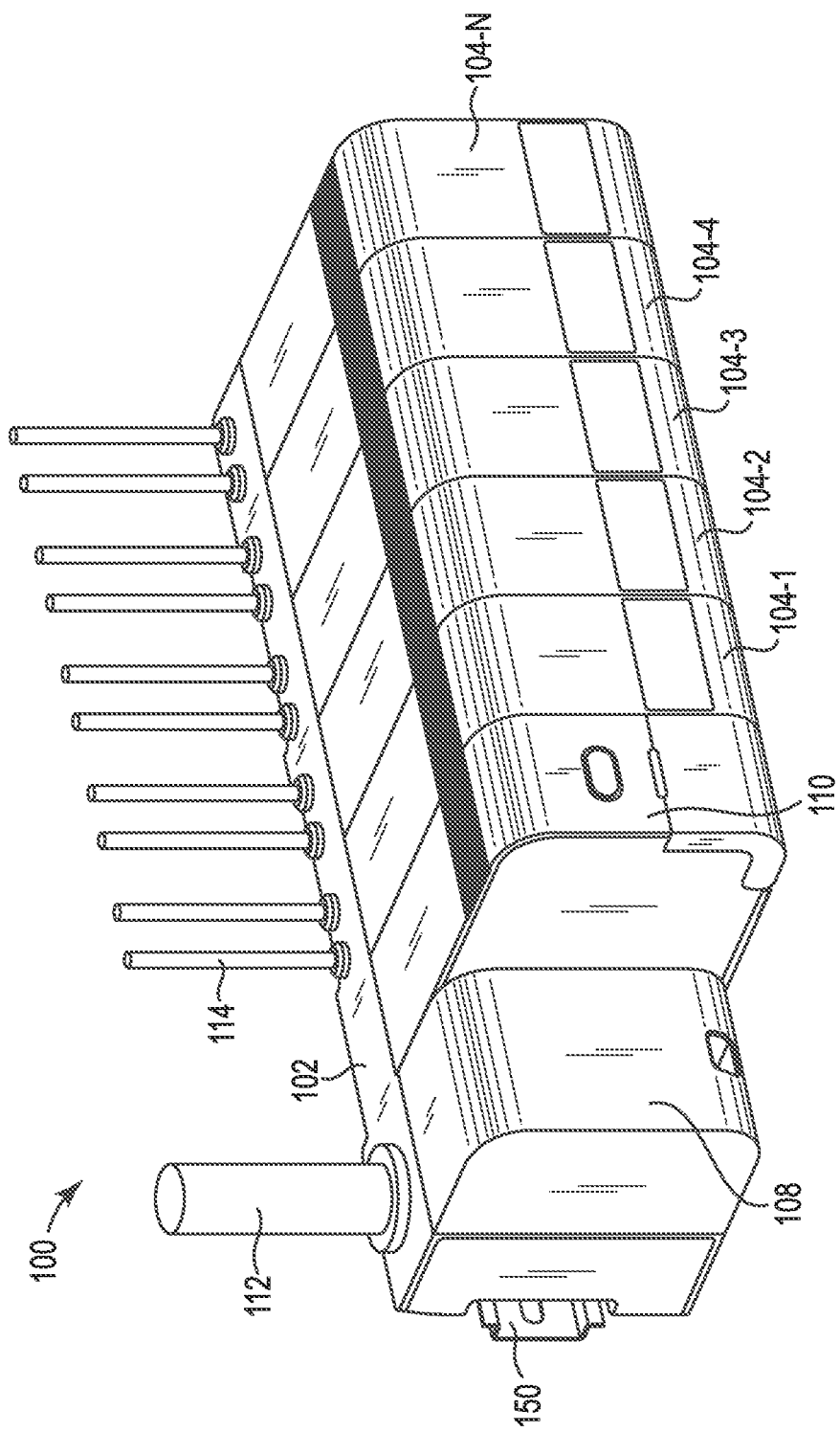
FIG. 1 is an illustration of a perspective view of an aspirated smoke, gas, or air quality monitoring system device that can be used in accordance with an embodiment of the present disclosure.

This insect guard is a product differentiator for air detection systems as it meets regulatory requirements while reducing or minimizing resistance to air flow or air movement and reducing the likelihood of blockage due to contamination of the guard. A spiral insect guard, which may be made of plastic, metal, or other solid material, is placed in such a way that air containing smoke must pass through it before entering the region where smoke may be detected. The distance of the spacing between the turns of the spiral is set so that insects are prevented from entering the smoke detection area and potentially triggering a false alarm. FIG. 1 shows an implementation of an air monitoring system having an insect guard.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an illustration of a perspective view of an aspirated smoke, gas, or air quality monitoring system device that can be used in accordance with an embodiment of the present disclosure. As shown in FIG. 1, in some embodiments, each detector module (which in the embodiment illustrated in FIG. 1 has two sample tubes associated with it) and the system has detector modules that can be individually removed and/or replaced.

This can be beneficial as individual modules can be selectively removed for maintenance or repair without having to disconnect the sampling tubes. Similarly, the insect guard can be removed and cleaned or replaced.

As shown in FIG. 1, the illustrated embodiment is a modular aspirated smoke, gas, or air quality monitoring system device 100 that includes a base 102 onto which a number of detector modules 104 are attached thereto. The base 102 includes a number of components thereon. For example, the base includes a cable conduit 112 (large tube) that allows cabling to be routed through the interior of the conduit and connected to the aspirated smoke, gas, or air quality monitoring system device via an aperture in the device.

The cable conduit 112 connects to a cable management module 108 portion of the base 102. The cable management module 108 has a housing with a cover to keep connections for power and data communication to and from the device out of sight and secure from tampering. The cable conduit also provides those functions. In the embodiment of FIG. 1, the cable management module is located on the left side of the device, however, the embodiments of the present disclosure are not so limited.

In the embodiment of FIG. 1, next to the cable management module is a communications module 110. The communications module 110 includes an easy access reset button (316 of FIG. 3) on the front. The communication module 110 also can include other operational buttons and/or dials within the housing and a cover (318 of FIG. 3) to also keep them out of sight and secure from tampering. In some embodiments, the cover can be or have a portion that is at least partially translucent, allowing a technician to see the status of the buttons/dials (e.g., their current settings), so the technician can see their status, but the buttons/dials are not accessible to be tampered with.

In some embodiments, the covers of one or more modules of the aspirated smoke, gas, or air quality monitoring system device can be secured such that they need to be removed by a tool (specialized tool carried by a technician). In this manner, it is likely that those wishing to tamper with the aspirated smoke, gas, or air quality monitoring system device will not be able to access the internal components of the modules.

On the right side of the aspirated smoke, gas, or air quality monitoring system device illustrated in FIG. 1, a number of detector modules 104-1 . . . 104-N (referred to generally as modules 104) are provided. These detector modules each contain one or more sensors that sense one or more environmental elements in the sampled air moving through the one or more tubes connected to the detector. Sensors can, for example, detect particulate, such as smoke particles, or gases, such as carbon monoxide, carbon dioxide, and/or detect other environmental elements that may indicate less than desirable air quality.

In the embodiment illustrated in FIG. 1, each detector 104 is connected to multiple channels/tubes 114. The aspirated smoke, gas, or air quality monitoring system device embodiment illustrated in FIG. 1 also includes five detector modules 104 each having two channels, meaning this device can sample on ten channels, however the number of modules and/or channels per module is not so limited. The embodiment of FIG. 1 also includes a mounting bracket 150 for mounting the device to a wall or rack.

Figure 2:
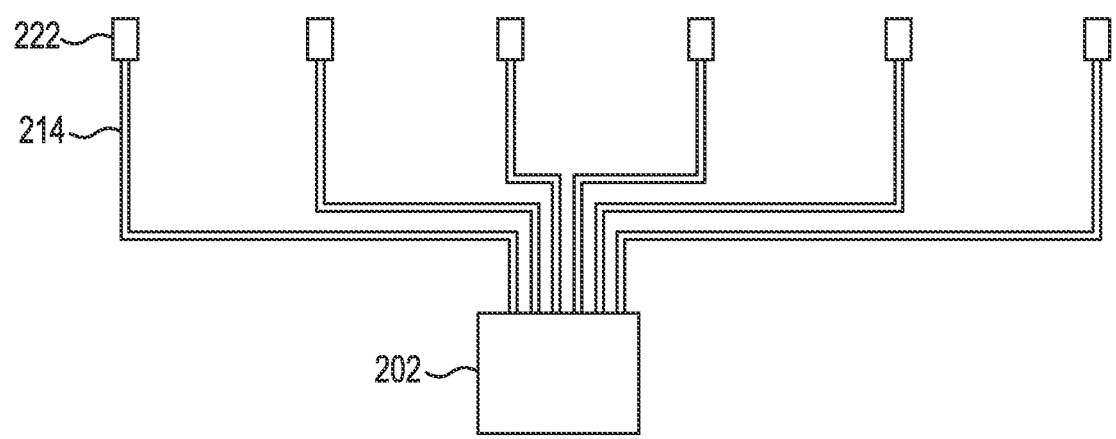
FIG. 2 is an illustration of an aspirated smoke, gas, or air quality monitoring system that can be used in accordance with an embodiment of the present disclosure.

FIG. 2 is an illustration of an aspirated smoke, gas, or air quality monitoring system that can be used in accordance with an embodiment of the present disclosure. In such a system, the aspirated smoke, gas, or air quality monitoring system can include a sensing unit 202 (unit 102 of FIG. 1) having a detector module (module 104 of FIG. 1) that includes at least one particulate sensing chamber within the detector module and an air inlet (424 in FIG. 4) connecting one end of the sampling tube 214 to the particulate sensing chamber allowing communication of air from the sampling tube 214 to the particulate sensing chamber.

A sampling point 222 is connected at the other end of the sampling tube 214. The sampling point collects air from an area being monitored and a pump pulls the air through the sampling point 222 into the sampling tube 214, through the tube and into the sensing unit 202, where the air is tested for particulate, chemicals or other items that may be harmful to occupants or indicate an emergency condition (fire) in the monitored area.

A spiral shaped insect guard (440 in FIG. 4) can be positioned in the sampling point 222, sampling tube 214, or sensing unit 202. Locating the insect guard in the sensing unit can be beneficial as it allows for easy access for cleaning and/or replacement. Locating the insect guard in the sampling point or in the sampling tube can be beneficial as the location is closer to where the insects enter the system.

The monitoring system can be configured to be located within a building and as shown in FIG. 2, the sensing unit can be configured to be located in a first location (first room) and the sample point configured to be located in a second location (second room) that is different than the first location. For example, the second location can be remotely located (office area) from the first location (building mechanical area).

Figure 3:
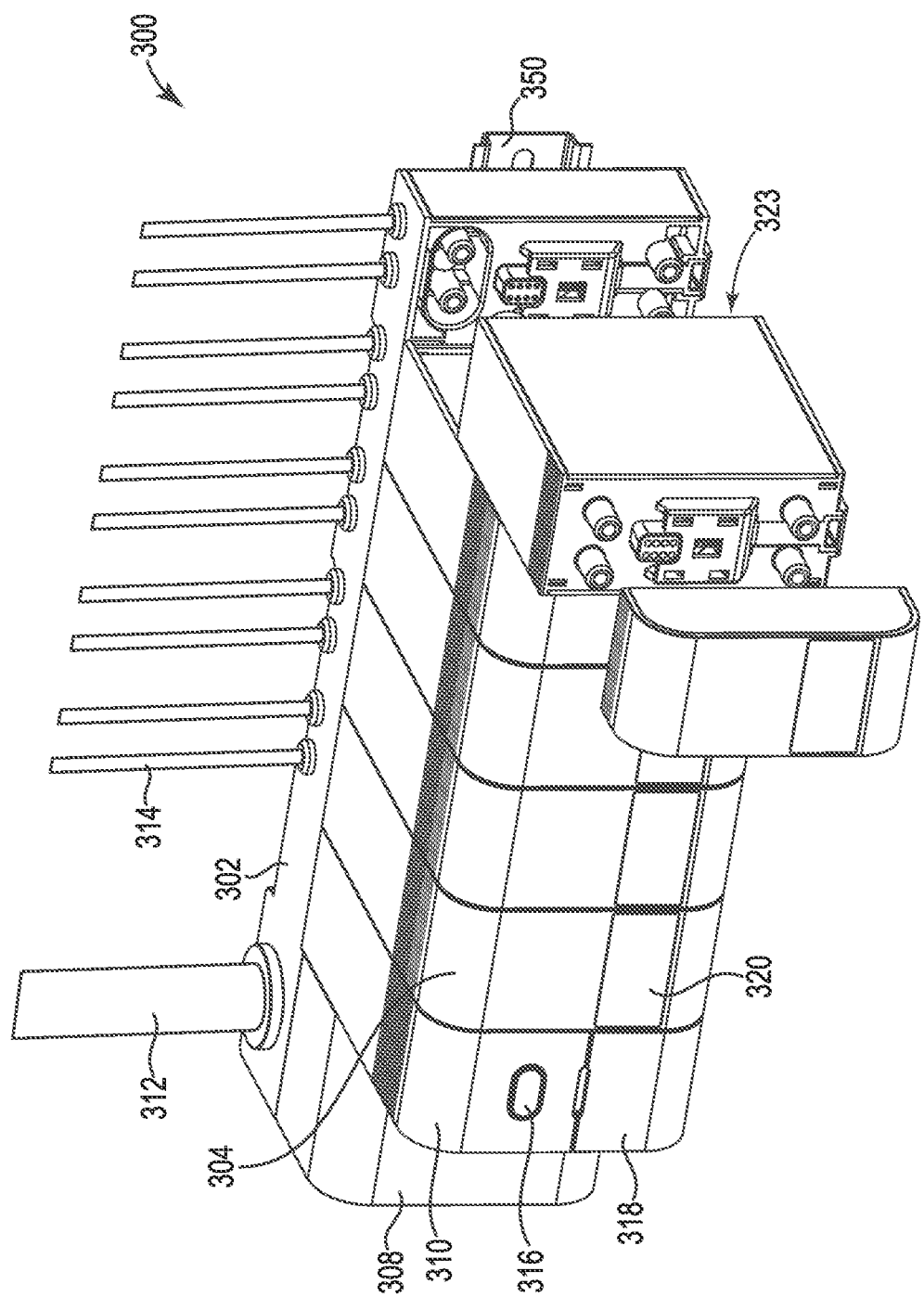
FIG. 3 is an illustration of a perspective view of an aspirated smoke, gas, or air quality monitoring system device with one of the detector modules removed in accordance with an embodiment of the present disclosure.

FIG. 3 is an illustration of a perspective view of an aspirated smoke, gas, or air quality monitoring system device with one of the detector modules removed in accordance with an embodiment of the present disclosure. As in FIG. 1, FIG. 3 also shows the cable conduit 312, the cable management module 308 and the communication module 310, with reset button 316 and cover 318. FIG. 3 also provides a more detailed view of the interior components of the base as well as the detector module and its filter module/cover.

As shown in FIG. 3, the detector modules are independently removeable from the base 302 of system 300. Each detector module also has a cover thereon that is removable. The cover can have a display 320 that indicates a status condition of the individual detector. In some embodiments, the cover can be a filter module as described in more detail below.

FIG. 3 also illustrates that the base 302 can have a number of tube connections that connect the tubes 314 to its associated detector module and circuitry connections for providing connections for power and data transmission purposes of the components of the module, such as for sensing components and data collection. Similar connections are also shown on the front surface of the detector. These connections can be used for attachment of other modules that can be added on (e.g., gas sensing module and/or air quality module, added to a smoke sensing module) to the detector module. In the embodiment of FIG. 3 the base 302 can include a pump to facilitate movement of air through the tubes 314 and through the modules 304. FIG. 3 also shows the mounting bracket 350 attached to the back side of the base 302.

In some embodiments, each detector module can also have a filter that can be removed from the detector module without disassembling the detector module. Such functionality can thereby save the technician's time during maintenance of the system.

Figure 4:
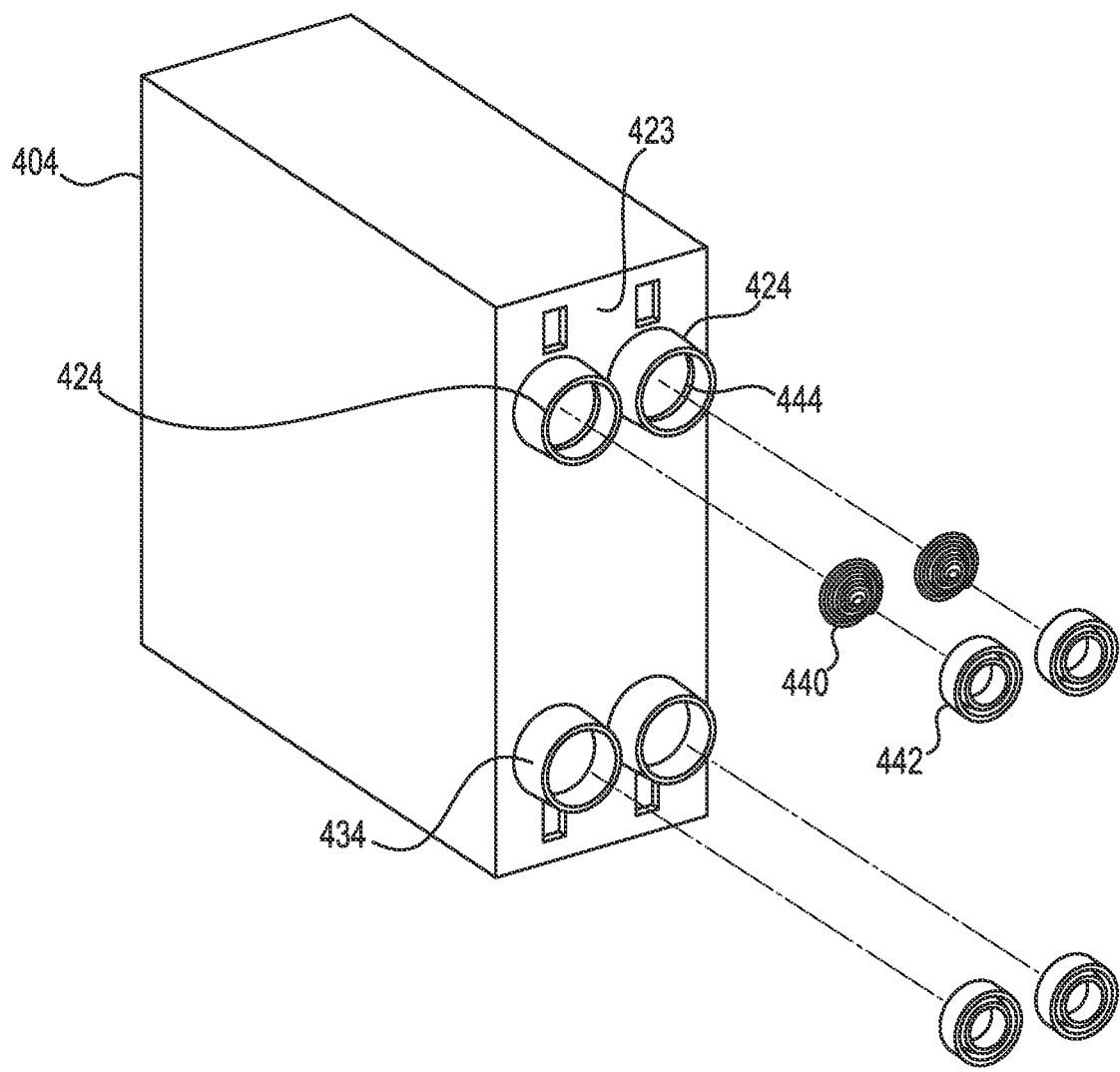
FIG. 4 is an exploded view illustration of one of the detector modules removed showing the insect guards in accordance with an embodiment of the present disclosure.

FIG. 4 is an exploded view illustration of one of the detector modules removed showing the insect guards in accordance with an embodiment of the present disclosure. In the embodiment illustrated in FIG. 4, the module 404 has multiple particulate sensing chamber inlets 424 on side 423 that corresponds with side 323 of FIG. 3. The inlets each connect to a different particulate sensing chamber within the module 404, and multiple particulate sensing chamber outlets 434.

In use, the module 404 is connected, via inlets 424 and outlets 434 to corresponding inlet and outlet ports of the base 302 of FIG. 3, such that the air to be tested can be communicated from tubes 314 to the module 304.

As can be understood from the layout of the module shown, in the embodiment of FIG. 4, the module 404 can be used to sample air through air paths (path of air through the sampling point, sampling tube, and detector module) from two sampling tubes 414. However, some embodiments may have more or less air sampling paths provided therein.

Each air sampling path draws air in from one of the tubes 314 and tests the air to see if it contains smoke, undesired chemicals, or a threshold level of particulate (by using a sensor in the particulate sensing chamber designed to identify one or more such particles). Additionally, the sensors can be easily changed to repurpose a unit to sense a different type of particle which can be beneficial in some implementations.

In the embodiment illustrated in FIG. 4, the insect guard 440 is a spiral shaped removable insect guard mounted within the inlet 424. In some embodiments, the interior surface of the inlet 424 has a ledge 444 formed thereon and where the ledge 444 is shaped to allow a portion of an outer surface of the insect guard to rest on the ledge 444. For example, the non-ledge portion of the interior surface of the inlet has a first diameter, but the portion where the ledge is located has a second diameter that is smaller than the first diameter. The diameter of the insect guard is less than the first diameter, but larger than the second diameter. In this way, the insect guard is sized to fit inside the inlet, but large enough so that an outer edge of the insect guard rests on the ledge, thereby fixing the insect guard inside the inlet.

The implementation of FIG. 4 also includes a gasket 442 that is inserted into the inlet 424 after the insect guard 440 is inserted and inhibits the removal of the insect guard 440 from the inlet 424. The gasket 442 frictionally interacts with the inner surface of the inlet 424 to inhibit the removal of the insect guard 440 from the inlet 424. In some embodiments, an adhesive material is interposed between an outer surface of the gasket 442 and the inner surface of the inlet 424 to inhibit the removal of the insect guard 440 from the inlet 424.

The spiral of the spiral insect guard 440 is comprised of a number of coils of wire that are coiled around a central reference point forming the center of the spiral. The spacing between these wire coils can be any suitable distance. For example, the spacing distance can be determined based on an applicable government standard. For instance, in one example embodiment, the spiral of the spiral insect guard 440 is comprised of a single wire that is coiled in a number of coils of wire and wherein a maximum opening size between adjacent outside surfaces of two adjacent coils is not greater than 1.27 mm.

Figure 5A:
FIGS. 5A-5E are illustrations of different wire element cross sectional shapes in accordance with different embodiments of the present disclosure.

FIGS. 5A-5E are illustrations of different wire element cross sectional shapes in accordance with different embodiments of the present disclosure. FIG. 5A provides the easiest design to manufacture with the wire element forming the spiral insect guard have a circular cross section 541-A.

Figure 5B:
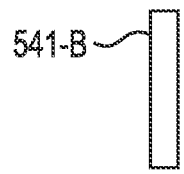
Figure 5C:
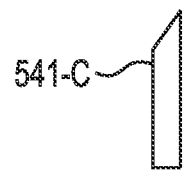

Another easy to manufacture design is shown in FIG. 5B, with a rectangular cross section 541-B. This design may be beneficial in implementations where less particulate settling on the guard is desired as, if the air is traveling from top to bottom, its top surface area is less than the circular cross section embodiment.

Other quadrilateral shapes can be used. For example, in FIG. 5C, an end of a rectangular cross sectional can be tapered to reduce the top surface to reduce the flat area that particulate can collect on and increase aerodynamics which increases airflow around the wire and decreases air turbulence which reduces the ability for particulate to land on the surfaces of the wire.

Figure 5D:
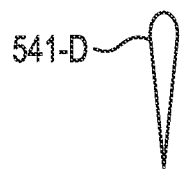
Figure 5E:
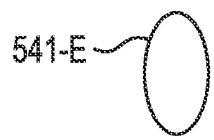

Such aerodynamic effects can also be provided by the designs shown in FIGS. 5D and 5E at 541-D and 541-E. These ellipsoidal and tear drop designs have a larger top area which will provide more area to collect particulate, but both increase flow speed and decrease resistance due to turbulence.

The embodiments of the present disclosure provide greater flexibility in creating an aspirated smoke, gas, or air quality monitoring system that includes an insect guard that provides more air flow and allows the insect guard to be independently cleanable and/or replaceable.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An aspirated smoke, gas, or air quality monitoring unit, comprising:
   a detector module that includes at least one particulate sensing chamber within the detector module and an air inlet connecting a sampling tube to the particulate sensing chamber allowing communication of air from the sampling tube to the particulate sensing chamber; and
   a spiral shaped insect guard positioned within the inlet, wherein an interior surface of the inlet has a ledge formed thereon and where the ledge is shaped to allow a portion of an outer surface of the insect guard to rest on the ledge.

2. The monitoring unit of claim 1, wherein the insect guard is a spiral shaped removable insect guard mounted within the inlet.

3. The monitoring unit of claim 1, wherein the insect guard is a spiral shaped removable insect guard mounted within the inlet and wherein the inlet also includes a gasket that is inserted into the inlet after the insect guard is inserted and inhibits the removal of the insect guard from the inlet.

4. The monitoring unit of claim 1, wherein the spiral is comprised of a number of coils of wire and wherein a maximum opening size between adjacent outside surfaces of two adjacent coils is not greater than 1.27 mm.

5. The monitoring unit of claim 1, wherein the spiral is comprised of a number of coils of wire and wherein the wire has a circular cross section.

6. The monitoring unit of claim 1, wherein the spiral is comprised of a number of coils of wire and wherein the wire has an ellipsoidal cross section.

7. The monitoring unit of claim 1, wherein the spiral is comprised of a number of coils of wire and wherein the wire has a rectangular cross section.

8. The monitoring unit of claim 1, wherein the spiral is comprised of a number of coils of wire and wherein the wire has a quadrilateral shaped cross section.

9. The monitoring unit of claim 1, wherein the spiral is comprised of a number of coils of wire and wherein the wire has a tear drop cross section.

10. The monitoring unit of claim 1, wherein each detector module includes multiple particulate sensing chambers with each particulate sensing chamber having an inlet.

11. The monitoring unit of claim 10, wherein each inlet includes one insect guard.

12. The monitoring unit of claim 11, wherein each insect guard is removable.

13. An aspirated smoke, gas, or air quality monitoring unit, comprising:
    a detector module that includes at least one particulate sensing chamber within the detector module and an air inlet connecting a sampling tube to the particulate sensing chamber allowing communication of air from the sampling tube to the particulate sensing chamber; and
    a spiral shaped insect guard positioned within the inlet and wherein the inlet includes a gasket that is inserted into the inlet after the insect guard is inserted and inhibits the removal of the insect guard from the inlet.

14. The monitoring unit of claim 13, wherein the gasket frictionally interacts with the inner surface of the inlet to inhibit the removal of the insect guard from the inlet.

15. The monitoring unit of claim 13, wherein an adhesive material is interposed between an outer surface of the gasket and the inner surface of the inlet to inhibit the removal of the insect guard from the inlet.

16. The monitoring unit of claim 13, wherein the insect guard is a spiral shaped removable insect guard mounted within the inlet.

17. The monitoring unit of claim 13, wherein an interior surface of the inlet has a ledge formed thereon and where the ledge is shaped to allow a portion of an outer surface of the insect guard to rest on the ledge.

18. An aspirated smoke, gas, or air quality monitoring unit, comprising:
    a detector module that includes at least one particulate sensing chamber within the detector module and an air inlet connecting a sampling tube to the particulate sensing chamber allowing communication of air from the sampling tube to the particulate sensing chamber; and
    a spiral shaped insect guard positioned within the inlet, wherein the spiral is comprised of a number of coils of wire and wherein a maximum opening size between adjacent outside surfaces of two adjacent coils is not greater than 1.27 mm.

* * * * *